United States Patent [19]

Fukinuki et al.

[11] 4,301,479
[45] Nov. 17, 1981

[54] SIGNAL PROCESSING SYSTEM OF FACSIMILE

[75] Inventors: Takahiko Fukinuki, Kokubunji; Hiroshi Yoshigi, Hachioji; Yumiko Shimazaki, Akikawa, all of Japan

[73] Assignee: Hitachi, Ltd., Tokyo, Japan

[21] Appl. No.: 76,426

[22] Filed: Sep. 17, 1979

[30] Foreign Application Priority Data

Sep. 18, 1978 [JP] Japan ............................ 53-113614

[51] Int. Cl.³ .......................................... H04M 7/12
[52] U.S. Cl. .................................. 358/257; 358/260; 358/288
[58] Field of Search ..................... 358/257, 260, 288

[56] References Cited

U.S. PATENT DOCUMENTS

| | | | |
|---|---|---|---|
| 3,061,672 | 10/1962 | Wyle | 358/261 |
| 4,044,382 | 8/1977 | Yagishita | 358/260 |
| 4,186,415 | 1/1980 | Takayama | 358/260 |

OTHER PUBLICATIONS

H. Wyle et al., "Reduced-Time Facsimile Transmission by Digital Coding", 9-24-61, pp. 215-217, IRE Comm. Syst.

B. M. Rosenheck, "Fastfax, A Second Generation Facsimile System Employing Redundancy Reduction Techniques", vol. COM-18, No. 6, Dec. 1970, pp. 772-776, IEEE Transaction on Communication Technology.

*Primary Examiner*—Robert L. Richardson
*Assistant Examiner*—Edward L. Coles
*Attorney, Agent, or Firm*—Craig and Antonelli

[57] ABSTRACT

A group III facsimile which substantially reduces the transmission time is disclosed wherein marks are applied to a document to be transmitted in order to identify the portions of the document depending on whether or not to be transmitted, after the document is scanned the presence or absence of the marks in the scanned lines, that is, whether or not the scanned output signals are to be transmitted will be determined by the electrical signals scanned, and in place of scanned lines unnecessary to transmit, special code signals are sent each of which consists of less bits, for example, a code indicating that one line is wholly white, a fill code, and a code indicating the end of a line.

4 Claims, 4 Drawing Figures

SIGNAL PROCESSING SYSTEM OF FACSIMILE

BACKGROUND OF THE INVENTION

1. Field of the Invention

This invention relates in general to a signal processing system for a group III facsimile, and more particularly concerns a signal processing system in which the portions of a document to be transmitted are identified in accordance with whether or not they are to be transmitted, in order to transmit selectively the document information.

2. Description of the Prior Art

In the field of facsimile systems in which document information is converted to electrical signals by document scanning and the signals are transmitted in the form of scanned output signal waveforms without eliminating the redundancy of the document information, there is known a system which reduces the transmission time by applying special marks to portions of a document to be transmitted to transmit the scanned output signals which correspond to only the marked portions, for example, as shown in Japanese Patent Application Kokoku (Post-Exam. Publn) No. 11451/72, entitled "Facsimile". However, in such a system, the sub-scanning rate is switched according to the absence or presence of the marks, and in order to reduce the transmission time, the send side facsimile must send that switching information to the receive side facsimile which, in turn, performs a special operation only when receiving the information. Therefore, the above-mentioned system always requires a combination of special send and receive facsimiles each with the above-mentioned additional function.

This means that the system has no compatibility with existing facsimiles.

In addition, in such a conventional system, there has been a defect in that the system cannot be applied to a facsimile of the type which encodes scanning signals and after eliminating the redundancy of the document information, transmits them, for example, to a group III facsimile which operates according to run length code signals or code signals which correspond to the two-dimensional correlation of document.

SUMMARY OF THE INVENTION

Accordingly, it is an object of the present invention to provide an improved signal processing system for a group III facsimile in which the selected portions of a document to be transmitted are automatically identified, transmitted and decoded at the facsimile.

It is another object of the present invention to provide a signal processing system for a group III facsimile of the type described in which the transmission time is remarkably reduced without adding a special device to an existing group III facsimile.

To achieve the above and further objects that may hereinafter appear, the present invention provides a system in which identification marks are applied to the selected portions of a document to determine whether or not the portions are to be transmitted, the presence or absence of the marks is detected from signals after scanning the document, and according to the detected results, the transmission of the document information which corresponds to scanned lines which need not be transmitted is stopped, and instead, special codes are transmitted in lieu thereof, each of which consists of the least necessary number of bits to transmit one line.

The above-mentioned marks may be applied to either the portions to be transmitted or to the portions not to be transmitted, as desired.

The signal processing system according to the present invention does not require a special adaptor to identify such marks, that is, the system can detect the marks by processing electronically normally-scanned output signals. Further, the system provides such an advantage that it does not require a special circuit to control the subscanning. In other words, the system of the present invention is compatible with existing facsimiles.

Other objects and advantages of the present invention will become clear from the following more detailed description of the present invention in which reference is made to preferred embodiments shown in the accompanying drawings, and in which:

DESCRIPTION OF THE PREFERRED EMBODIMENT

Figure 1:
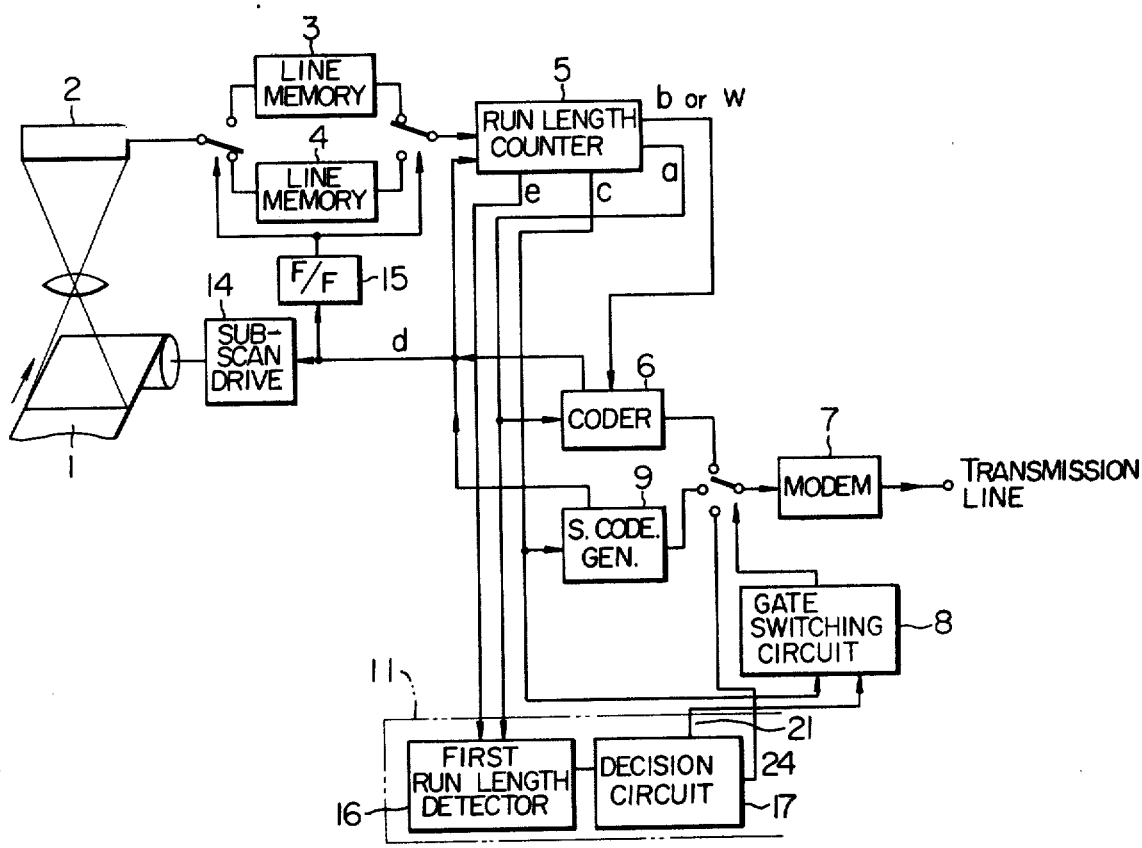
FIG. 1 is a block diagram of an embodiment of a signal processing system of a send side facsimile according to the present invention.

Turning now to the drawings, there is shown in FIG. 1 a block diagram of an embodiment of a signal processing system of a send facsimile according to the present invention.

First, the operation of a typical group III facsimile will be explained briefly in the following. A document to be transmitted is scanned by a sensor 2 which converts the document information into binary-coded signals. The signals are recorded alternately into two line memories 3 and 4. In a group III facsimile in which conversion of one-dimensional run length codes to two-dimensional codes provides a reduction of the number of bits to be transmitted, the two line memories 3 and 4 are provided to read and store the next line of information while the system is encoding one line. As soon as one line has been encoded in a coder circuit (which will be described later), the above-mentioned memories are mutually switched from the write mode to the read mode. In order to distinguish lines clearly at the time of writing lines into the memories, the first bit (which corresponds to the leftmost end of the document) may be purposely made a bit representing white.

The output from the memory 3 or 4 is sent to a run length counter 5 which counts the continuous number of bits representing white or black (that is, '1' or '0') document elements. The run length counter 5 is a kind of run length encoder which converts each run length of white and black into a binary code signal representing the run length. The run length counter 5 comprises output terminals producing the binary run length coded or counted value "a", white or black information "w" or "b", a start signal "e" produced at the time of start of the counting and an end signal "c" produced when the counting for one line is completed. After counting one run length, the run length counter 5 supplies to a coder circuit 6 the white or black information 'b' or 'w' and the counted value 'a', i.e. run length information.

The coder circuit 6 converts the counted value to the coding system employed in the associated facsimile, for example, to Modified Huffman Codes, and applies the data via a modem 7 to a transmission line (for example, a telephone line).

As soon as one scanned line has been encoded, the run length counter 5 issues to a gate switching circuit 8 a signal 'c' which indicates one scanned line has been counted. When the gate switching circuit 8 receives the signal 'c', it switches to an end code generator 9, supplies to the modem 7 a synchronizing signal, i.e., a signal which indicates one scanned line has been encoded EOL ('end of line' code), and then switches itself to the coder circuit 6. After the coder circuit 6 completes encoding which corresponds to one line, it sends an end signal 'd' to both a sub-scan driver 14 and a flip-flop 15. At the same time, the sub-scan driver 14 acts to feed the document by one line for sub-scanning, the flip-flop 15 is inverted to change the mode of the memories 3 and 4, that is, from the write mode to the read mode, or vice versa, and the run length counter begins to count the run length in the next line. The above-mentioned arrangement and operation are substantially the same as those of a group III facsimile of the well-known type.

In such a type of group III facsimile, the number of transmitting bits per line changes depending on the information amount of each line of a document to be transmitted. This means that the sub-scanning rate varies with the information amount.

The number of bits required for transmission per line must be equal to or more than that of the least numbers of bits necessary for the receive facsimile to operate. However, if the number of bits to be transmitted is less than the least number, a fill code is added in addition to the bits representative of the document information and the bits indicative of 'end of line'.

According to the present invention, a conventional group III facsimile can be used to transmit a bit signal consisting of the least bits in place of the portions of a document which need not be transmitted. In addition, the receiver of the facsimile does not require a special adaptor.

Figure 2:
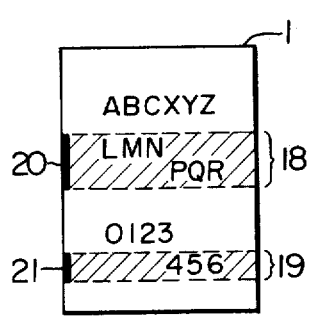
FIG. 2 is an example of a transmitting document used in the signal processing system of FIG. 1.

In the above-mentioned embodiment, as shown in FIG. 2, black marks 20 and 26 of a predetermined width are applied to the left ends of portions 18 and 19 on a document 1 representing portions to be transmitted, and with respect to lines for which such marks are not detected from the scanned output signal obtained through the document scanning, a special signal is transmitted which consists of three codes including a code indicating that one line is wholly white, i.e., it contains no information to be transmitted, a fill code, and an EOL code representative of 'end of line'.

According to such an arrangement, in the portion without marks, each scanning line starts with a white run and continues over a considerable length (for example, for a horizontal resolution of 8 lines per mm, 64 or more), whereas, in portions with marks, even if the first one bit is forcedly replaced with a white run as has been described earlier, the scanning line is followed by black runs. For this reason, marks can be identified by checking the length of the first white run. In an arrangement in which the first one bit is not forcedly replaced with a white run, the scanning line may start with a black run.

However, if this is regarded as a white run of length O, the above-explanation will be similarly applied to the case. As a result, this embodiment is arranged so that if the length of the first white run is shorter than a predetermined length, the subsequent scanned output signal of the line is transmitted, while, if it is longer than the predetermined length, the transmission of the subsequent scanned output signal is stopped, instead, a special code is transmitted which comprises the least number of bits necessary to transmit one line. Explanation will be made in detail with reference to the drawings.

Figure 3:
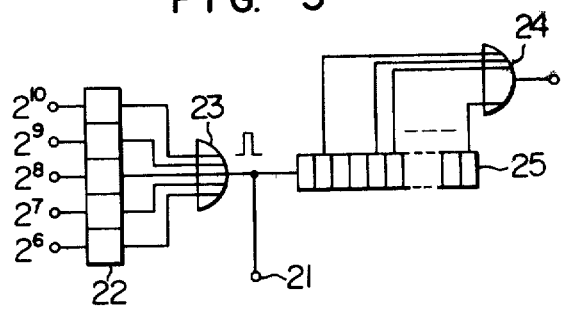
FIG. 3 is a circuit diagram of an embodiment of a decision circuit 17 in the signal processing system of FIG. 1.

In FIG. 1, a first run length detector 16 is provided to receive in response to a start signal 'e' the run length signal 'a' representative of the first white run of one scanned line and supply the received run length signal to the decision circuit 17. Then, the decision circuit 17 decides whether or not the run length of the white run exceeds the predetermined length. There is shown in FIG. 3 an embodiment of the decision circuit 17 in which bit signals which correspond to the bits of a binary code representative of the first white run length from the first run length detector 16 are applied to corresponding inputs of a register 22. In this case, the bit signals of digits $2^6$, $2^7$–$2^{10}$ in the binary code are connected to the associated inputs of the register 22. The outputs from the register 22 are then connected to an OR gate 23. Therefore, if the length of the first white run is equal to or greater than $2^6$ or 64, the OR gate 23 will generate an output signal in order to transmit a special code signal (which consists of the least bits of a whole white line code, a fill code and an EOL code, as has already been explained). More specifically, as soon as the OR gate 23 generates an output pulse, the output pulse is applied to a shift register 25 which, in turn, provides an output '1' to an OR gate 24 each time the pulse shifts and only when the special code signal corresponds to '1'. On the other hand, the output from the OR gate 23 is also connected to the gate switching circuit 8 (see FIG. 1) via a point 26 to associate operatively the OR gate 24 with the modem 7.

Turning back to FIG. 1, at the time that the special code has been transmitted, the gate switching circuit 8 connects the OR gates 24 to the modem 7, which generates an EOL signal 'd' thereby to operate the sub-scan driver 14, in the same manner as in a conventional facsimile. At the same time, the EOL signal 'd' operates the flip-flop 15 to switch the line memories 3 and 4 from the rear mode to the write mode, or vice versa.

According to the above-mentioned embodiment, for the portions with black marks 20 or 26 shown in FIG. 2, the system operates in exactly the same manner as a conventional group III facsimile. Whereas, for the portions without black marks shown in FIG. 2, the system operates in exactly the same manner as when one line is wholly white in a conventional group III facsimile. This means that the receive facsimile will not require an additional special adaptor and during the portions without black marks, the receive facsimile will record no information.

Figure 4:
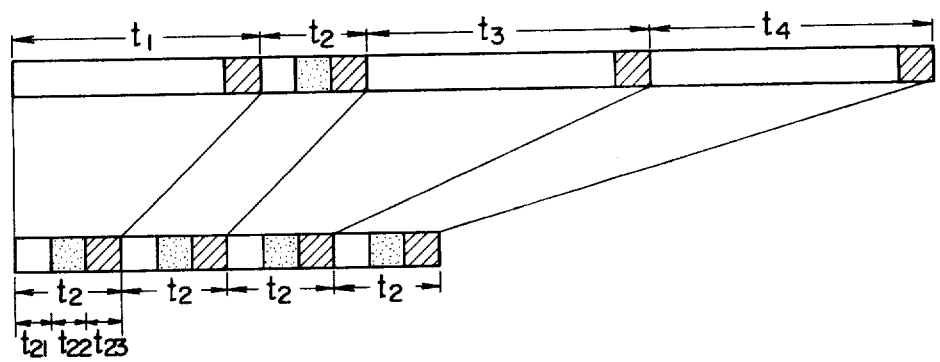
FIG. 4 is a timing diagram of two different transmission signals for explaining the operation of the system according to the present invention.

FIG. 4 shows a timing diagram of two different transmission signals each of which corresponds to 4 continuous scanning lines for explanation of the operation of the system according to the present invention. In this case, A is a transmission signal which is directly transmitted through a conventional group III facsimile, and B is a transmission signal which is transmitted through the group III facsimile according to the present invention, that is, in this case, when the information of the four scanning lines is unnecessary to transmit. $t_1$, $t_2$, $t_3$ and $t_4$ are the bit lengths of 4 lines when the 4 lines are transmitted as 4 scanned signals. Time $t_2$ means the time interval that one line is entirely white; $t_{21}$, $t_{22}$ and $t_{23}$ are respectively the time interval necessary to transmit a code indicating that one line is entirely white, the time interval necessary to transmit a fill code and the time interval necessary to transmit an EOL code. This means that $t_2 = t_{21} + t_{22} + t_{23}$ is a total time taken to transmit the least bits necessary for one line. Therefore, if it is unnecessary to transmit the scanned information of the four lines mentioned above, the group III facsimile according to the present invention takes only $4t_2$, which results in a remarkable reduction of the transmission time.

While the present invention has been disclosed with reference to a preferred embodiment, it would be understood that the invention is not limited to the particular embodiment but rather to include all alternatives, modifications and equivalent arrangements covered by the scope of the appended claims. Accordingly, the mark configuration, how to detect marks and the special code representation can be changed in a suitable manner according to the conditions. For example, other embodiments are as follows.

(1) In the above-mentioned embodiment (black marks are applied to the portions unnecessary to transmit), the transmission of a synchronizing code signal can be omitted. That is, for a scanning line, only a fill code can be transmitted without transmitting the synchronizing code signal. Under this condition, the paper of the recording section at the receive facsimile will not be fed and thus only the information of scanned lines to be transmitted is recorded without the black portion information on the recording paper.

(2) In two-dimensional coding based on the correlation between scanning lines in which one-dimensional coding is made every K lines (K is about 2 to 4), all scanning lines are not necessarily required to decide whether or not such lines are to be transmitted and therefore only the one-dimensional coding part can be used to decide it.

(3) In order to minimize the possibility of a faulty decision, a particular plurality of stripe patterns in place of a single black stripe marks can be employed.

(4) In the case where the scanner operation is carried out with a density of 8 lines per mm, an unnecessary portion can be sub-scanned with a density of 4 lines per mm. In this case, the synchronizing signal could be sent to the receive facsimile, with half a period of the singal.

(5) The above-mentioned processing can be performed in various forms such as a private wired logic circuit or a general purpose processor.

(6) Although the above-mentioned embodiment has been explained in a case where marks are applied to the left ends of the document and when a mark is detected the processing is performed for the related scanned line, the present invention is not limited to the particular embodiment. For example, marks may be applied to the right ends of the document and according to the result, processing of the next scanning line may be varied.

(7) In fact, black marks might be detected erroneously due to the fact that the document is dirty. For this reason, identification of a black mark can be made only after, if the first white run is shorter than the predetermined lenght, then, without deciding immediately that the line has a black mark, the next black run is checked to confirm that it is equal to or longer than the predetermined length (for example, 4 mm (32 document elements)).

(8) Where the next black run is checked due to the fact that the first white run is shorter than the predetermined length, as the first step, the white run is encoded and transmitted. Then, as a result of checking the next black, if it is actually a black mark run and is to be omitted from the transmission, then, 0 run (which means the run length is zero) or 1 run code (which means the run length is 1) of the black mark, for example, and then a white run length code are sent so that a total of these codes reaches the predetermined length.

(9) Identification of marks has been made according to the run length in (1) to (8). However, the identification can be made depending on whether the number of black runs does not exceed the predetermined number within a certain range (for example, document element 10 to 20 from the left ends of the document) in a scanned line.

(10) Any code can be transmitted as a special code. This will allow only one scanning line to be processed as a transmission error at the receive side, without providing any effect on the receive side paper.

What is claimed is:

1. A signal processing system of a group III facsimile comprising conversion means for converting the information detected from documents into electrical signals by scanning the documents on which marks are applied to portions thereof to identify the portions according to whether or not they are to be transmitted; decision means for deciding whether or not the scanned lines are to be transmitted by detecting signals which correspond to the marks from the output of said conversion means; and means responsive to the output of said decision means for transmitting a special code signal which consists of the least necessary number of bits to transmit one line, while blocking transmission of the scanned output signal, with respect to scanning lines that are to be transmitted.

2. The signal processing system according to claim 1 wherein said special code signal comprises three codes of a code indicating that one line is wholly white, a fill code and an end of line code.

3. The signal processing system according to claim 1 wherein said special code signal comprises the same codes as those obtained through scanning of a simple pattern document, and an end of line code indicative of the end of a line.

4. The signal processing system according to claim 1 wherein said decision means comprises a circuit which decides according to the run length from an one-line start signal to said mark.

* * * * *